US012609865B2

(12) United States Patent
Iyer et al.

(10) Patent No.: US 12,609,865 B2
(45) Date of Patent: Apr. 21, 2026

(54) OPTIMIZING TCAM UTILIZATION VIA AUTOMATICALLY CREATED TCAM PROFILES

(71) Applicant: Arista Networks, Inc., Santa Clara, CA (US)

(72) Inventors: Anirudh Ramesh Iyer, Bangalore (IN); Deepanshu, Bangalore (IN); Pavan Krishnamurthy, Bangalore (IN); Satish Kumar Selvaraj, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 41 days.

(21) Appl. No.: 18/749,960

(22) Filed: Jun. 21, 2024

(65) Prior Publication Data

US 2025/0392513 A1     Dec. 25, 2025

(51) Int. Cl.
*G06F 15/177*     (2006.01)
*H04L 41/08*     (2022.01)
*H04L 41/0893*     (2022.01)

(52) U.S. Cl.
CPC ...... *H04L 41/0886* (2013.01); *H04L 41/0893* (2013.01)

(58) Field of Classification Search
CPC .................. H04L 41/0886; H04L 41/0893
See application file for complete search history.

(56) References Cited

U.S. PATENT DOCUMENTS

| | | | |
|---|---|---|---|
| 6,651,096 B1 | 11/2003 | Gai et al. | |
| 6,658,002 B1 | 12/2003 | Ross et al. | |
| 6,658,458 B1 | 12/2003 | Gai et al. | |
| 6,874,016 B1 | 3/2005 | Gai et al. | |
| 7,133,914 B1 | 11/2006 | Holbrook | |
| 7,904,642 B1 | 3/2011 | Gupta et al. | |
| 8,316,151 B1 | 11/2012 | Ammundi | |
| 8,886,879 B2 * | 11/2014 | Dey ...................... G11C 15/00 365/49.1 | |
| 9,672,239 B1 * | 6/2017 | Rottenstreich .... H04L 45/74591 | |
| 11,711,370 B2 | 7/2023 | Ranjan et al. | |
| 2003/0225964 A1 | 12/2003 | Krishnan et al. | |
| 2006/0104286 A1 | 5/2006 | Cheriton | |

(Continued)

FOREIGN PATENT DOCUMENTS

WO     2018045862 A1     3/2018

OTHER PUBLICATIONS

Mckeown et al., OpenFlow: Enabling Innovation in Campus Networks, ACM SIGCOMM Computer Communication Review, vol. 38, No. 2, Apr. 2008, pp. 69-74.

*Primary Examiner* — Duyen M Doan

(74) *Attorney, Agent, or Firm* — Fountainhead Law Group, PC

(57)     ABSTRACT

A framework for automatically creating ternary content-addressable memory (TCAM) profiles for a network device is provided. In certain embodiments, the framework can automatically create a TCAM profile for the network device that defines a minimal qualifier set for every TCAM-enabled feature configured on the device, where the minimal qualifier set includes only the qualifiers actually used by the configured rules of that feature (rather than all of the feature's possible qualifiers). With this approach, the framework can advantageously automate the process of tuning the device's TCAM for optimal utilization.

16 Claims, 6 Drawing Sheets

(56) References Cited

U.S. PATENT DOCUMENTS

| | | |
|---|---|---|
| 2006/0155875 A1 | 7/2006 | Cheriton |
| 2006/0294297 A1 | 12/2006 | Gupta |
| 2007/0022479 A1 | 1/2007 | Sikdar et al. |
| 2007/0195778 A1 | 8/2007 | Tatar et al. |
| 2013/0290622 A1 | 10/2013 | Dey et al. |
| 2014/0082176 A1 | 3/2014 | Basso et al. |
| 2014/0095782 A1 | 4/2014 | Koktan et al. |
| 2015/0229565 A1* | 8/2015 | Ravipati ........... H04L 45/74591 |
| | | 711/108 |
| 2015/0333929 A1* | 11/2015 | Le ....................... H04L 45/7452 |
| | | 711/108 |
| 2017/0085488 A1 | 3/2017 | Bhattacharya et al. |
| 2017/0346765 A1 | 11/2017 | Immidi |
| 2018/0278525 A1 | 9/2018 | Levy et al. |
| 2020/0314179 A1 | 10/2020 | He et al. |
| 2021/0359939 A1 | 11/2021 | Wan et al. |
| 2021/0359997 A1* | 11/2021 | Ranjan ................. G06F 13/4022 |
| 2023/0052252 A1* | 2/2023 | Katzri ............... H04L 45/74591 |

* cited by examiner

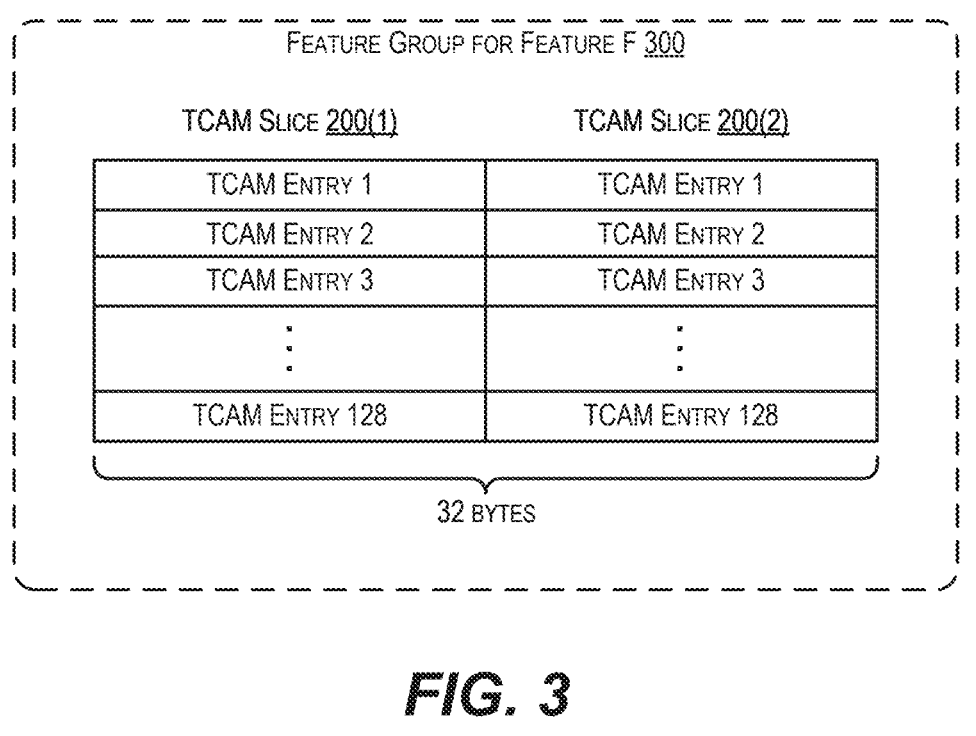

FEATURE GROUP FOR FEATURE F 300

| TCAM SLICE 200(1) | TCAM SLICE 200(2) |
|---|---|
| TCAM ENTRY 1 | TCAM ENTRY 1 |
| TCAM ENTRY 2 | TCAM ENTRY 2 |
| TCAM ENTRY 3 | TCAM ENTRY 3 |
| ⋮ | ⋮ |
| TCAM ENTRY 128 | TCAM ENTRY 128 |

32 BYTES

*FIG. 3*

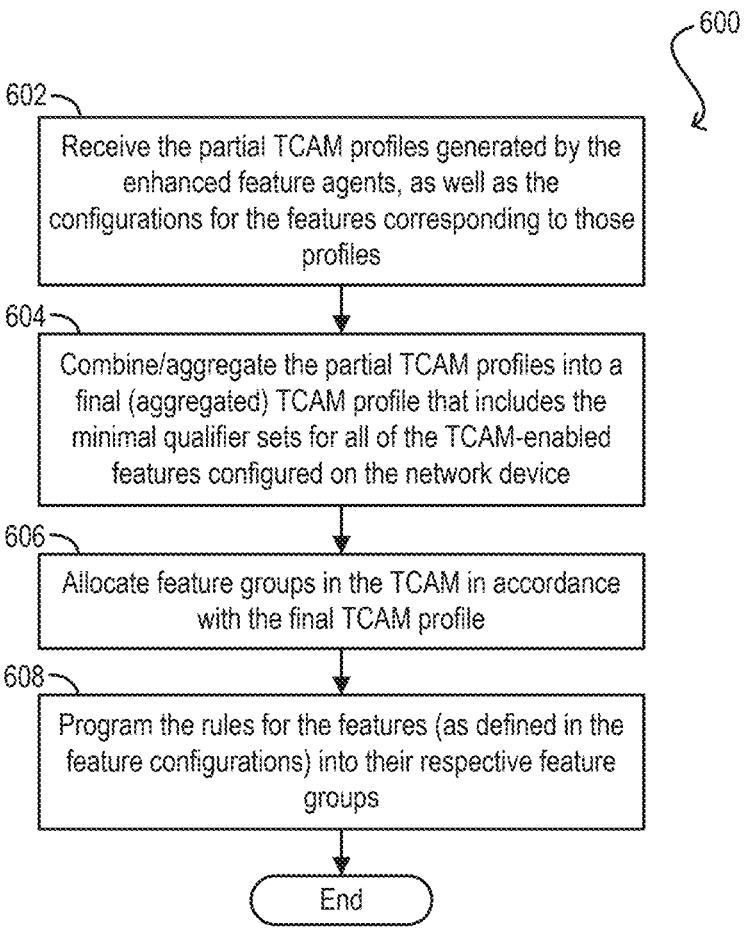

600

602
Receive the partial TCAM profiles generated by the enhanced feature agents, as well as the configurations for the features corresponding to those profiles 604
Combine/aggregate the partial TCAM profiles into a final (aggregated) TCAM profile that includes the minimal qualifier sets for all of the TCAM-enabled features configured on the network device 606
Allocate feature groups in the TCAM in accordance with the final TCAM profile 608
Program the rules for the features (as defined in the feature configurations) into their respective feature groups End

*FIG. 6*

OPTIMIZING TCAM UTILIZATION VIA AUTOMATICALLY CREATED TCAM PROFILES

BACKGROUND

Ternary content-addressable memory (TCAM) is a type of physical memory that enables fast, parallel matching of its data contents against an input (search key). In network devices like switches and routers, TCAM is used to implement various network management, control, and security features such as policy-based routing (PBR), quality of service (QOS), access control lists (ACLs), and so on. These features are referred to herein as TCAM-enabled features because they rely on the high-speed data matching capabilities of TCAM.

One challenge with implementing TCAM-enabled features on a network device is that TCAM is expensive, which means the amount of TCAM available on the device will often be limited. Accordingly, it is important to ensure that the device's TCAM resources are utilized as efficiently as possible.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts an example feature group within a TCAM in accordance with certain embodiments of the present disclosure.

FIG. 6 depicts a workflow executed by a TCAM profile manager in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

The present disclosure describes a framework for automatically creating TCAM profiles for a network device. Generally speaking, a TCAM profile is a data structure that defines a set of qualifiers that are applicable to (or in other words, may be used by the rules of) a TCAM-enabled feature. This qualifier set determines the width of the TCAM entries that are programmed in the network device's TCAM for that feature. Examples of qualifiers include source Internet Protocol version 4 (IPv4) address, destination IPv4 address, source Internet Protocol version 6 (IPv6) address, destination IPv6 address, source port, destination port, protocol, Differentiated Services Code Point (DSCP), and so on.

As explained below, in certain embodiments the framework of the present disclosure can automatically create a TCAM profile for the network device that defines a minimal qualifier set for every TCAM-enabled feature configured on the device, where the minimal qualifier set includes only the qualifiers actually used by the configured rules of that feature (rather than all of the feature's possible qualifiers). With this approach, the framework can advantageously automate the process of tuning the device's TCAM for optimal utilization.

1. Example Network Device and Solution Overview

Figure 1:
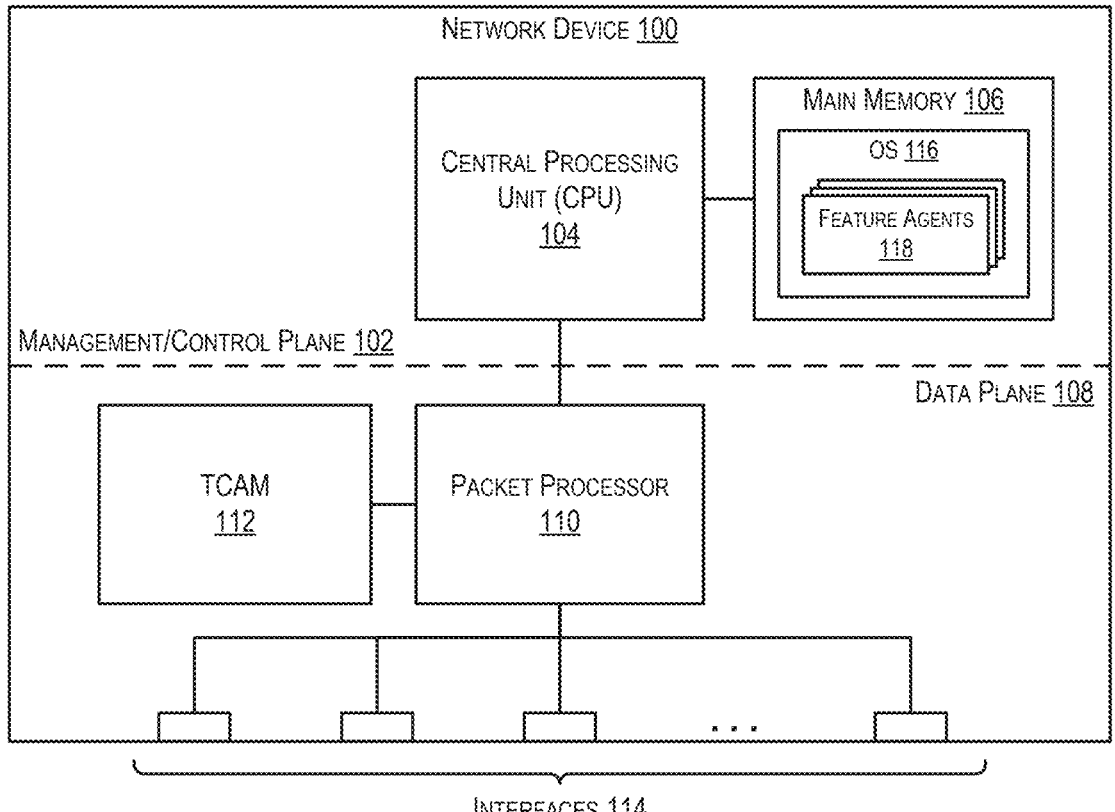
FIG. 1 depicts an example network device in accordance with certain embodiments of the present disclosure.

FIG. 1 is a simplified block diagram of an example network device 100 (e.g., switch, router, etc.) in which the framework of the present disclosure may be implemented. As shown, network device 100 includes a management/control plane 102 comprising a central processing unit (CPU) 104 and a main memory 106, as well as a data plane 108 comprising a packet processor 110, a TCAM 112, and a plurality of interfaces (ports) 114. In some embodiments, network device 100 may include two or more of some of the components shown in FIG. 1, for example, CPU 104, TCAM 112, and packet processor 110.

CPU 104 is a general-purpose processor that is responsible for managing the configuration/operation of network device 100 and controlling the device's understanding of the network in which it resides. CPU 104 carries out these functions under the direction of an operating system (OS) 116 that runs on CPU 104 from main memory 106.

Packet processor 110 is an integrated circuit, such as an application-specific integrated circuit (ASIC) or field-programmable gate array (FPGA), that is responsible for performing line-speed processing of network packets (traffic) that pass through network device 100 via interfaces 114. The line-speed processing performed by packet processor 110 includes, among other things, the execution of various TCAM-enabled features that are configured on network device 100 by a set of feature agents 118. Examples of these TCAM-enabled features include policy-based routing (PBR), quality of service (QOS), access control lists (ACLs), mirroring, Direct Flow, Open Flow, and Storm Control metering/monitoring.

Generally speaking, each TCAM-enabled feature configured on network device 100 is associated with a set of rules that govern how packet processor 110 should handle network traffic, where each rule includes one or more match criteria and an action. The match criteria specify qualifiers (e.g., packet fields) and corresponding data that indicate which network packets match (or in other words, are subject to) the rule. For instance, a match criterion that specifies source IPv4 address as a qualifier will typically identify an IPV4 prefix indicating the range of source IPv4 addresses that result in a match. The action indicates how packet processor 110 should handle network packets that match the rule in accordance with the match criteria. Common actions include "permit" (which means that a matched packet should be allowed to be forwarded to its destination), "deny" (which means that a matched packet should be dropped/ blocked), and "redirect" (which means that a matched packet should be redirected to an alternative destination).

By way of example, the following table presents the contents of a sample IPV4 ACL comprising three rules R1, R2, and R3:

TABLE 1

| Rule ID | Match Criteria | Action |
|---------|----------------|--------|
| R1 | Source IPv4 address: 10.1.0.0/16 | Permit |
| R2 | Source IPv4 address: 11.1.0.0/16 | Permit |
| R3 | Source IPv4 address: 12.1.0.0/24 Protocol: UDP | Deny |

Rules R1 and R2 in this ACL indicate that network packets with a source IPv4 address falling within the range 10.1.0.0 to 10.1.255.255 (as represented by IPv4 prefix 10.1.0.0/16) or the range 11.1.0.0. to 11.1.255.255 (as represented by IPv4 prefix 11.1.0.0/16) should be permitted. Rule R3 indicates that network packets with a source IPv4 address falling within the range 12.1.0.0 to 12.1.0.255 (as represented by IPv4 prefix 12.1.0.0/24) and pertaining to the UDP protocol should be denied.

At the time a given TCAM-enabled feature F is configured on network device 100, the feature agent 118 for F receives (from a stored configuration file or from a device user via a user interface) a configuration for F that comprises F's rules and programs the rules into fixed-width TCAM entries that are allocated for F within TCAM 112. Upon being programmed in this manner, packet processor 110 enforces the rules on incoming and/or outgoing network packets by matching the packets against the match criteria specified in the TCAM entries and executing the corresponding actions on the matched packets.

Figure 2:
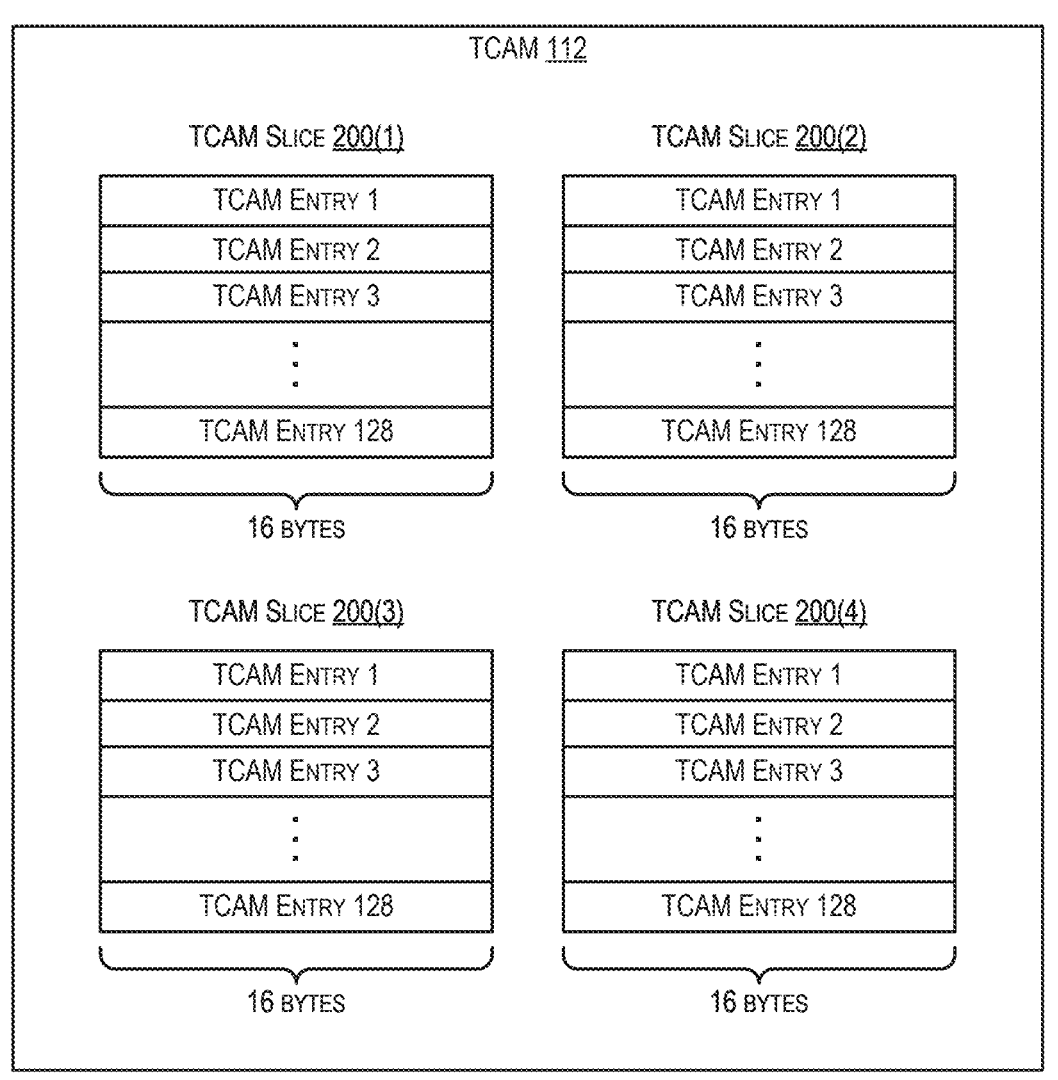
FIG. 2 depicts an example hardware layout of a TCAM in accordance with certain embodiments of the present disclosure.

The TCAM entries that are allocated for feature F in TCAM 112 are collectively referred to as the feature group for F and the fixed width of these TCAM entries is dependent on two factors: the qualifier set of F and the widths of the TCAM slices in TCAM 112. As mentioned previously, a qualifier set of a TCAM-enabled feature refers to the qualifiers that are applicable to (i.e., used by the rules of) the feature. A TCAM slice is the smallest physical partition or segment of a TCAM that can be allocated for use by a TCAM-enabled feature. For example, FIG. 2 depicts an example hardware layout of TCAM 112 that comprises four TCAM slices 200(1)-(4), where each TCAM slice includes 128 TCAM entries and has a width of 16 bytes.

TCAM slices 200(1)-(4) may be allocated independently to the TCAM-enabled features of network device 100 or may be combined (chained) in various ways if the size requirements of a feature exceed the size of a single TCAM slice. For instance, assume feature F discussed above has a qualifier set that includes source IPv4 address (4 bytes), destination IPv4 address (4 bytes), source port (2 bytes), destination port (2 bytes), protocol (1 byte), and DSCP (1 byte), as well as an action field that is 4 bytes long. This qualifier set may be, e.g., a "default" qualifier set that is automatically assigned to feature F at the time it is configured and includes all possible qualifiers for F, as determined by the network device manufacturer. Because a single rule of feature F may include match criteria for all of the qualifiers in this qualifier set, the maximum TCAM entry width needed for F is 4+4+2+2+1+1+4=18 bytes, which exceeds the 16-byte width of a single TCAM slice 200. Accordingly, network device 100 will horizontally chain together two TCAM slices in this scenario to create the feature group for F, such that each TCAM entry in the feature group has a fixed width of 16+16=32 bytes. This is shown in FIG. 3, which depicts a feature group 300 for F that is created by horizontally chaining together TCAM slices 200(1) and 200(2) of TCAM 112.

One issue with horizontally chaining together TCAM slices to accommodate the qualifier set of a TCAM-enabled feature is that the rules included in the feature's configuration may not actually use all of the qualifiers in the qualifier set. For instance, continuing with the example of feature F, assume the rules included in the configuration of Fare rules R1, R2, and R3 presented in Table 1. In this case, because the configured rules make use of at most two qualifiers (i.e., source IPv4 address and protocol in rule R3), the largest TCAM entry that is actually needed for feature F is 4 bytes (source IPv4 address)+1 byte (protocol)+4 bytes (action)=9 bytes wide, which can fit within a single TCAM slice 200. However, because the qualifier set for feature F indicates a maximum TCAM entry width of 18 bytes, network device 100 will nevertheless allocate a feature group for F that horizontally chains together two TCAM slices as shown in FIG. 3 to accommodate that possibility. This means that the second (chained) TCAM slice will effectively be wasted, as it will not be used by rules R1, R2, and R3 of feature F (and cannot be allocated to any other TCAM-enabled feature that is configured on network device 100).

Some network devices attempt to mitigate this issue by allowing device users to manually create and configure TCAM profiles for the TCAM-enabled features of the device, where each TCAM profile specifies a user-defined qualifier set for its corresponding feature. Thus, with respect to feature F above, it would be possible for a device user to manually create/configure a TCAM profile for F that includes a qualifier set comprising only source IPv4 address and protocol. The configuration of this TCAM profile would cause network device 100 to allocate a feature set for F that is composed of a single TCAM slice 200, thereby avoiding the inefficiency of allocating two horizontally-chained slices.

However, this user-driven approach is problematic because it requires the device users to know which qualifiers are used by the configured rules of each feature in order to define qualifier sets that result in improved TCAM utilization. It is relatively common for a single TCAM-enabled feature to include hundreds or thousands of rules in its configuration (and there may be several such features), which means that in many cases it will be overly burdensome and time-consuming for the device users to determine this information in a manual fashion.

Figure 4:
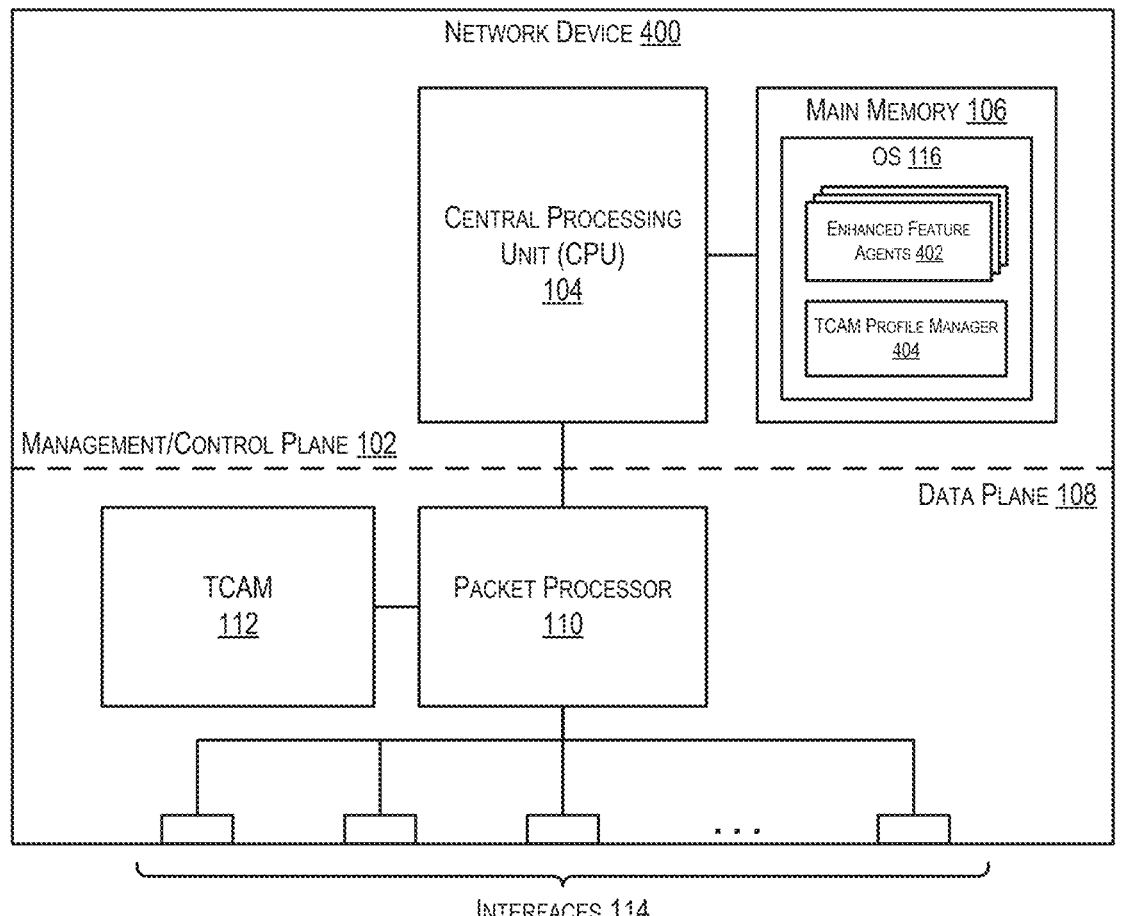
FIG. 4 depicts another example network device in accordance with certain embodiments of the present disclosure.

To address the foregoing and other related problems, FIG. 4 depicts a modified version 400 of network device 100 of FIG. 1 that implements a novel framework for automatically creating optimal TCAM profiles. As shown, this framework comprises a set of enhanced feature agents 402 and a new TCAM profile manager 404 within OS 116 of the device.

At a high level, each enhanced feature agent 402 can parse the configuration that it receives for its corresponding TCAM-enabled feature and, based on this parsing, can automatically determine a minimal qualifier set for the feature and create a partial TCAM profile that includes the determined minimal qualifier set. "Minimal qualifier set" in this context refers to a qualifier set that only includes the qualifiers that are actually used in the match criteria of the rules that are included in the feature's configuration. For instance, in the example of feature F above, the minimal qualifier set for F would include only source IPv4 address and protocol, because these are the only two qualifiers used by rules R1, R2, and R3 (which are the rules included in the configuration of F).

Once these partial TCAM profiles are created, TCAM profile manager 404 can combine/aggregate the partial TCAM profiles into a final TCAM profile that includes the minimal qualifier sets of all of the device's TCAM-enabled features. For example, if network device 400 implements PBR, QoS, and ACLs, the final TCAM profile will include the minimal qualifier sets for all three of these features (as determined by their respective enhanced feature agents). TCAM profile manager 404 can then allocate feature groups in TCAM 112 based on the final TCAM profile, such that the feature group allocated for each feature has the smallest possible TCAM entry width that is sufficient to accommodate all of the qualifiers in the feature's minimal qualifier set. For example, if a particular TCAM-enabled feature has a minimal qualifier set that will fit within a single TCAM slice 200 of TCAM 112, TCAM profile manager 404 will allocate a feature group for that feature which comprises only one TCAM slice (rather than multiple horizontally-chained TCAM slices). Finally, TCAM profile manager 404 can program the rules for the features (as defined in the feature configurations) into their respective feature groups within TCAM 112, thereby enabling packet processor 110 of network device 400 to enforce the rules on incoming and outgoing network traffic.

With the general approach and architecture described above, the framework of the present disclosure provides a number of advantages. First, by identifying the minimal qualifier set for each TCAM-enabled feature of network device 400 and including these minimal qualifier sets in the final TCAM profile, the framework ensures that the feature groups which are allocated in TCAM 112 based on the final TCAM profile make efficient use of the TCAM's resources, and specifically do not chain excess TCAM slices that are not required by the rules configured on the device. Stated another way, the framework guarantees that the final TCAM profile is "optimal" in the sense that it results in feature group allocations which are appropriately sized for their corresponding feature configurations, across all of the network device's TCAM-enabled features. It should be noted that whenever a change is made to the configuration of a particular feature (such as, e.g., the addition, modification, or removal of one or more rules), the enhanced feature agent for that feature can generate a new partial TCAM profile that includes the minimal qualifier set for the modified configuration and TCAM profile manager 404 can generate a new final TCAM profile that incorporates the new partial TCAM profile. This enables the framework to dynamically adjust the allocated feature groups in TCAM 112 in response to ongoing feature configuration changes received during the runtime of network device 400 and thus ensure that the feature groups remain appropriately sized in view of those changes.

Second, because the framework performs all of the steps noted above in an automated fashion (i.e., without user intervention), there is no need for device users to figure out which qualifiers are used by which features as part of a user-driven TCAM profile creation workflow. Instead, the device users can simply configure each feature and rely on the framework to create an optimal final TCAM profile that reflects those configurations.

It should be appreciated that FIGS. 1-4 and the foregoing high-level solution description are illustrative and not intended to limit embodiments of the present disclosure. For example, although FIGS. 1 and 4 depict a particular arrangement of components in network device 100/400, other arrangements are possible (e.g., the functionality attributed to a particular component may be split into multiple components, components may be combined, etc.). One of ordinary skill in the art will recognize other similar modifications, variations, and alternatives.

2. Enhanced Feature Agent Workflow

Figure 5:
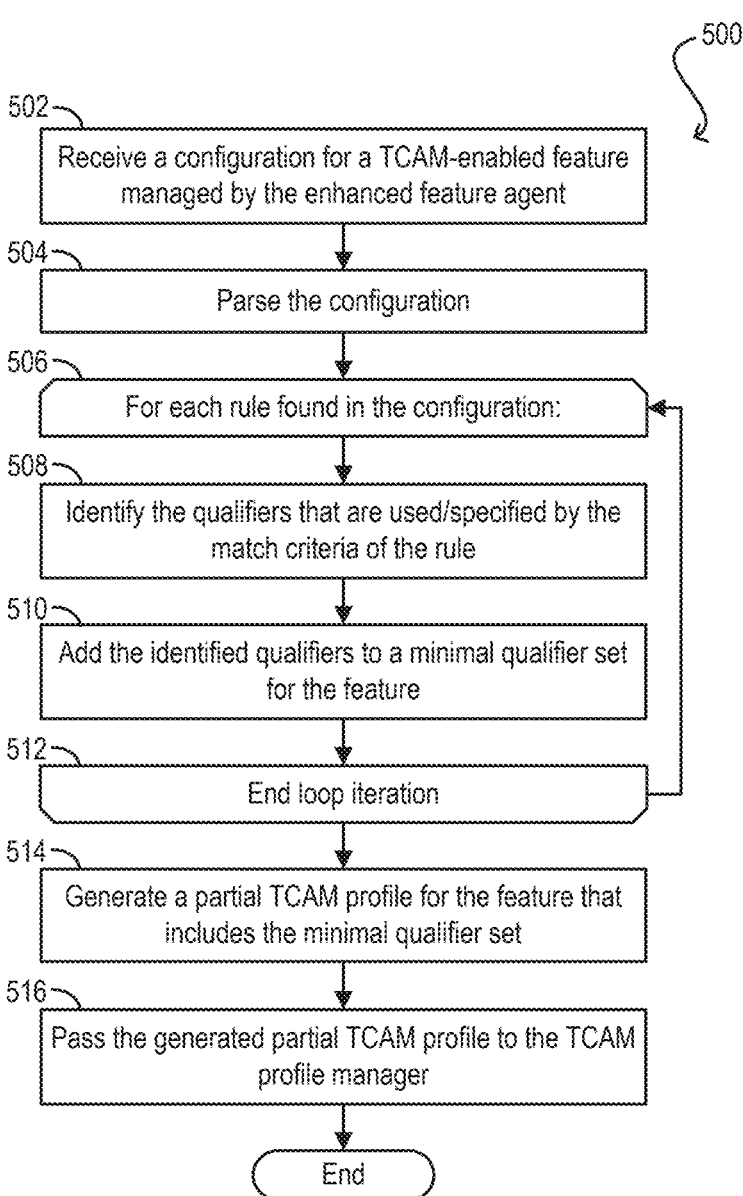
FIG. 5 depicts a workflow executed by an enhanced feature agent in accordance with certain embodiments of the present disclosure.

FIG. 5 depicts a workflow 500 that provides additional details regarding the processing that may be performed by each enhanced feature agent 402 of FIG. 4 for automatically creating a partial TCAM profile according to certain embodiments.

Starting with step 502, enhanced feature agent 402 can receive a configuration for a TCAM-enabled feature that is managed by the agent. In one set of embodiments, this configuration can be a saved configuration that is retrieved from, e.g., a stored configuration file at the time of initialization/boot up of network device 400. In other embodiments, this configuration can be a user-submitted configuration that is entered by a user of network device 400 (via, e.g., a command line interface (CLI) or some other user interface) during device runtime.

At steps 504 and 506, enhanced feature agent 402 can parse the configuration and enter a loop for each rule found therein. Within this loop, enhanced feature agent 402 can identify the qualifiers that are used/specified by the match criteria of the rule (step 508) and add the identified qualifiers to a minimal qualifier set for the feature (step 510). Enhanced feature agent 402 can then reach the end of the loop iteration (step 512) and return to the top of the loop in order to process the next rule.

At step 514, upon processing all of the rules in the configuration, enhanced feature agent 402 can generate a partial TCAM profile for the feature that includes the minimal qualifier set. Finally, enhanced feature agent 402 can pass the partial TCAM profile to TCAM profile manager 404 (step 516) and the workflow can end.

3. TCAM Profile Manager Workflow

FIG. 6 depicts a workflow 600 that provides additional details regarding the processing that may be performed by TCAM profile manager 404 of FIG. 4 for automatically creating a final TCAM profile for network device 400 according to certain embodiments Starting with step 602, TCAM profile manager 404 can receive the partial TCAM profiles generated by the enhanced feature agents per workflow 500 of FIG. 5, as well as the configurations for the TCAM-enabled features corresponding to those partial TCAM profiles. As mentioned previously, each partial TCAM profile includes a minimal qualifier set for its corresponding feature.

At step 604, TCAM profile manager 404 can combine/aggregate the partial TCAM profiles into a final (aggregated) TCAM profile that includes the minimal qualifier sets for all of the TCAM-enabled features configured on network device 400. TCAM profile manager 404 can then allocate feature groups in TCAM 112 in accordance with the final TCAM profile (step 606). In various embodiments, this allocation step comprises allocating a feature group for each feature that uses the minimum (or in other words, smallest) number of TCAM slices needed to accommodate all of the qualifiers in the feature's minimal qualifier set.

Finally, at step 608, TCAM profile manager 404 can program the rules for the features (as defined in the feature configurations) into their respective feature groups within TCAM 112 and the workflow can end.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device comprising a ternary content-addressable memory (TCAM), the method comprising:

for each TCAM-enabled feature in a plurality of TCAM-enabled features supported by the network device:
receiving a configuration for the TCAM-enabled feature that includes a set of rules;
for each rule in the set of rules:
identifying one or more qualifiers used by one or more match criteria of the rule; and
adding the one or more qualifiers to a minimal qualifier set for the TCAM-enabled feature, the minimal qualifier set including only qualifiers that are used by rules included in the configuration of the TCAM-enabled feature;
generating a partial TCAM profile for the TCAM-enabled feature that includes the minimal qualifier set;
aggregating the partial TCAM profiles generated for the plurality of TCAM-enabled features into a single TCAM profile; and
allocating a feature group in the TCAM for each TCAM-enabled feature in the plurality of TCAM-enabled features in accordance with the single TCAM profile, the allocated feature group comprising a subset of one or more TCAM slices in the TCAM.

2. The method of claim 1 wherein the configuration is retrieved from a stored configuration file at a time of initialization or boot up of the network device.

3. The method of claim 1 wherein the configuration is submitted by a user of the network device during runtime of the network device.

4. The method of claim 1 wherein the plurality of TCAM-enabled features supported by the network device include policy-based routing (PBR), quality of service (QoS), access control lists (ACLs), mirroring, Direct Flow, Open Flow, and Storm Control metering and monitoring.

5. The method of claim 1 wherein the receiving, the identifying, the adding, and the generating are performed automatically by the network device, without user intervention.

6. The method of claim 1 wherein the receiving, the identifying, the adding, and the generating are performed by a feature agent that is configured to manage the TCAM-enabled feature.

7. The method of claim 1 wherein the single TCAM profile includes the minimal qualifier sets for the plurality of TCAM-enabled features.

8. The method of claim 1 wherein the allocated feature group uses a minimum number of TCAM slices needed to accommodate all of the qualifiers in the TCAM-enabled feature's minimal qualifier set.

9. The method of claim 1 further comprising, for each TCAM-enabled feature in the plurality of TCAM-enabled features:

programming the set of rules included in the configuration for the TCAM-enabled feature into the feature set allocated for the TCAM-enabled feature.

10. A network device comprising:

a central processing unit (CPU);
a ternary content-addressable memory (TCAM); and
a main memory having stored thereon program code that, when executed by the CPU, causes the CPU to:
for each TCAM-enabled feature in a plurality of TCAM-enabled features supported by the network device:
receive a configuration for the TCAM-enabled feature that includes a set of rules;
for each rule in the set of rules:
identify one or more qualifiers used by one or more match criteria of the rule; and
add the one or more qualifiers to a minimal qualifier set for the TCAM-enabled feature, the minimal qualifier set including only qualifiers that are used by rules included in the configuration of the TCAM-enabled feature;
generate a partial TCAM profile for the TCAM-enabled feature that includes the minimal qualifier set;
aggregate the partial TCAM profiles generated for the plurality of TCAM-enabled features into a single TCAM profile; and
allocate a feature group in the TCAM for each TCAM-enabled feature in the plurality of TCAM-enabled features in accordance with the single TCAM profile, the feature group comprising a subset of one or more TCAM slices in the TCAM.

11. The network device of claim 10 wherein the plurality of TCAM-enabled features supported by the network device include policy-based routing (PBR), quality of service (QoS), access control lists (ACLs), mirroring, Direct Flow, Open Flow, and Storm Control metering and monitoring.

12. The network device of claim 10 wherein the receiving, the identifying, the adding, and the generating are performed automatically by the CPU, without user intervention.

13. The network device of claim 10 wherein the receiving, the identifying, the adding, and the generating are performed by a feature agent running on the CPU that is configured to manage the TCAM-enabled feature.

14. The network device of claim 10 wherein the allocated feature group uses a minimum number of TCAM slices needed to accommodate all of the qualifiers in the TCAM-enabled feature's minimal qualifier set.

15. The network device of claim 10 wherein the program code further causes the CPU to, for each TCAM-enabled feature in the plurality of TCAM-enabled features:

program the set of rules included in the configuration for the TCAM-enabled feature into the feature set allocated for the TCAM-enabled feature.

16. A method performed by a network device comprising a ternary content-addressable memory (TCAM), the method comprising:

receiving a plurality of partial TCAM profiles correspond-ing to a plurality of TCAM-enabled features configured on the network device, each partial TCAM profile including a minimal qualifier set for the corresponding TCAM-enabled feature, the minimal qualifier set including only qualifiers that are used by rules included in the configuration of the corresponding TCAM-en-abled feature;

aggregating the plurality of partial TCAM profiles into a single TCAM profile; and allocating a feature group in the TCAM for each TCAM-enabled feature in the plurality of TCAM-enabled features in accordance with the single TCAM profile, the feature group comprising a subset of one or more TCAM slices in the TCAM.

* * * * *